Feb. 8, 1966 N. C. LINCOLN ET AL 3,234,528

SEMI-PERMANENT MEMORY

Filed Oct. 23, 1962

INVENTORS
NORMAN C. LINCOLN &
PETER H. REYNOLDS

BY Carl V. Olson

ATTORNEY

United States Patent Office 3,234,528
Patented Feb. 8, 1966

3,234,528
SEMI-PERMANENT MEMORY
Norman C. Lincoln, Woodbury, and Peter H. Reynolds, Cherry Hill, N.J., assignors to Radio Corporation of America, a corporation of Delaware
Filed Oct. 23, 1962, Ser. No. 232,403
3 Claims. (Cl. 340—174)

This invention relates to semi-permanent read-only memories of the type wherein any selected information word may be read out electronically, and wherein the words stored in the memory are determined by the physical configurations of manually interchangeable members.

There are applications in electronic data processing apparatus for both random access memories and read-only memories. A read-only memory is one wherein the storage of information is relatively fixed by the mechanical or physical configuration or construction of the memory, and wherein the stored information can be electrically or electronically read out as frequently as is desired without destroying the stored information. Punched cards are an example of a read-only memory wherein each card is employed for the storage of one or more words. Punched cards are read one card at a time in time sequence. It is desirable to have a read-only memory capable of storing a large number of words, and having means for electronically addressing any selected one of the word locations for reading out the selected stored word. It is also desirable to have an electronically addressable read-only memory permitting of the convenient substitution of stored information words in the memory.

It is a general object of this invention to provide an improved fixed or read-only memory wherein the storage of information is determined by the configuration of conductors linking apertures in a plurality of magnetic cores.

It is another object to provide an improved read-only memory construction which permits of readily changing the stored information by substituting mechanical members determining the stored information.

It is a further object to provide an improved read-only memory wherein the stored information is determined by the absence of, or the presence and location of, holes punched to intercept conductors in an insulating sheet.

According to an example of the invention, there is provided a plurality of two-apertured magnetic cores, there being as many cores as there are information digits in each of the words to be stored in the memory. The magnetic cores are each constructed of an E-shape magnetic member having a removable magnetic bar located across the central and side legs to define a magnetic core having two apertures. The primary winding conductors are conductors that are printed in a ladder-pattern on an insulating sheet arranged to be inserted on the E-members so that the conductors go through the apertures of the cores when the bars are in place. The printed winding sheets and the conductors thereon are punched out at selective points to determine the information bits of the stored word on each sheet. Words of stored information can be readily changed by substituting one punched primary winding sheet for another. Also, words can be readily added or removed by respectively adding or removing the corresponding sheet and then replacing the removable bar. Information is read from the memory by energizing a selected one of the conductors on a printed sheet and sensing the signals induced on secondary windings on each magnetic core.

These and other objects and advantages of the invention will be apparent to those skilled in the art from the following more detailed description taken in conjunction with the appended drawing, wherein.

Figures 1, 2, 3:
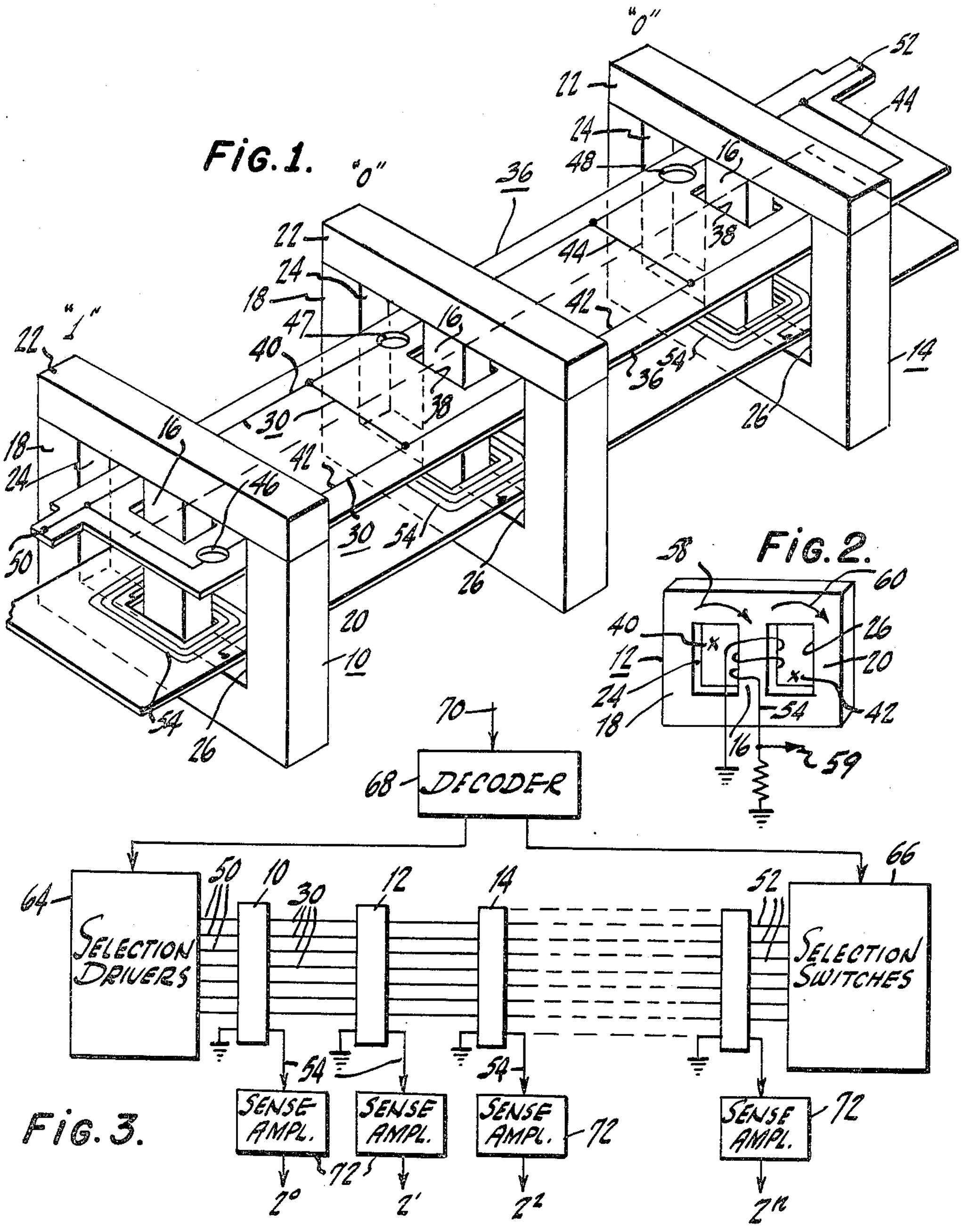
FIGURE 1 is a perspective view illustrating a semi-permanent read-only memory according to the invention wherein each primary winding for the storage of one word (only one being shown) is constructed in the form of a punched insulating sheet having a ladder-pattern printed primary winding conductor thereon.
FIGURE 2 is a representation of a single core which will be referred to in describing the operation of the memory of FIGURE 1.
FIGURE 3 is a block diagram of a fixed memory including the construction of FIGURE 1 and including associated electronic circuits.

Reference will now be made in greater detail to FIGURE 1 of the drawing which includes three magnetic cores 10, 12 and 14 each having E-shaped members with a central leg 16 and with two end legs 18 and 20. A magnetic bar 22 is positioned at the ends of the legs of each E-member to cooperate therewith to provide a magnetic core having two apertures 24 and 26. The E-members and bars are preferably constructed of a ferrite magnetic material such as is commonly employed for pulse transformers. The core material need not be one having a square loop hysteresis characteristic since the cores are used in the manner of transformer cores, rather than in the manner of memory cores having high retentivity in two magnetic states.

Each word of information stored in the memory is determined by the configuration of a primary winding conductor 30 which provides a conductive path extending through the aperture 24 of core 10 for the storage of a "1," extends through aperture 26 of core 12 for the storage of a "0," and extends through aperture 26 of core 14 for the storage of a "0." While FIGURE 1 shows only one primary winding conductor for the storage of one word having three bits, it will be understood that a memory according to the invention may have a larger number (such as sixty-four) of primary winding conductors 30 for the purpose of storing a corresponding number of words.

Each primary winding conductor 30 is constructed as a printed winding having a ladder pattern on a sheet 36 of insulating material such as the plastic "Mylar." Each primary winding sheet 36 is provided with apertures 38 adapted to fit over the central legs 16 of the respective magnetic cores and to have sides which fit within the side legs 18 and 20 of each core. Each ladder-pattern printed primary winding conductor 30 includes side conductors 40 and 42 extending through the respective apertures 24 and 26 of the cores, and transverse conductors 44 extending between the side conductors and located between the successive cores.

Each insulating sheet 36 of a ladder-pattern printed primary winding thereon is selectively punched for the storage of a desired word prior to assembly of the insulating sheet in the cores. The conductor 42 is punched out at 46 leaving the conductor 40 threaded through the aperture 24 for the storage of a 1 at the core 10. The conductor 40 is punched out at 47 and 48 leaving the conductor 42 passing through the apertures 26 in the cores 12 and 14 for the storage of 0's. Each of the conductors 30 has two terminals 50 and 52 for connection to electronic circuits as will be described.

The central leg 16 of each of the cores 10, 12 and 14 has wound therearound a multi-turn secondary winding 54. The secondary windings 54 are preferably printed windings having a pancake configuration, the windings being printed on a secondary winding insulating sheet 56 having the same general configuration as the primary winding insulating sheets 36.

FIGURE 2 will now be referred to in describing the operation of each of the magnetic cores in the arrangement of FIGURE 1. A primary winding conductor 40 carrying a current pulse going into the paper causes a change in magnetic flux around the aperture 24 in the direction represented by the arrow 58. This change, by transformer action, induces a signal in the secondary winding 54 which appears at the output terminal 59 as a signal pulse of one polarity which may represent a stored 1. An output signal of the opposite polarity representing a stored 0 is provided when the primary winding conductor 42 of another word is energized by a current pulse going into the paper through aperture 26 to produce flux in the direction represented by the arrow 60. The one of the apertures through which a primary winding passes determines the direction of the flux in the central leg 16 and determines the polarity of an output signal induced on the secondary winding 54.

The signals, described above, are induced in the secondary winding 54 during the leading edge of the interrogation pulse applied to a primary winding conductor 40. The trailing edge of each interrogation pulse causes the induction of an opposite-polarity signal in the secondary winding. Solely the signals due to the leading edge of the interrogation pulse (or the trailing edge) are sensed by strobing the sense amplifier (FIGURE 3) in the customary manner.

FIGURE 3 illustrates a memory system including a plurality of cores including those labeled 10, 12 and 14, all the cores being linked by conductors 30 each of which defines one of a plurality of words stored in the memory. The terminals 50 and 52 of each primary winding conductor 30 are connected to selection drivers 64 and selection switches 66, respectively. The drivers 64 and switches 66 are operated under the control of a decoder 68 in response to signals on input lead 70 which identifies the particular word desired to be read out from the read-only memory. The driver 64, switches 66 and decoder 68 may be conventional known circuits for the selection of one of a number of conductors or word lines in a memory. The secondary coil 54 wound on each of the cores is coupled to a respective sense amplifier 72. The several sense amplifiers each provide one digit of the interrogated word on the output leads labeled $2^0$, $2^1$, $2^2$ and $2^n$.

Thus, the operation of the read-only memory is such that every time an interrogation pulse is applied to a selected one of the primary winding conductors 30, the information bits available at the outputs of the sense amplifiers 72 represent the information bits of the selected word stored in the memory by the configuration of the respective primary winding.

The insulating sheets 36 with ladder-pattern printed windings 30 thereon may be supplied unpunched to a memory user. The user can punch the sheets to provide for the storage of a corresponding number of information words in a manner analogous to the usual punching of information on paper cards. The user can, by removing the keepers 22 from the E-members, insert the punched secondary sheets in the cores. Thereafter, the user can conveniently add, remove, or change a word or words stored in the memory by adding or removing primary sheets or substituting one or more punched primary sheets for one or more punched primary sheets in the memory.

What is claimed is:

1. A memory construction for the storage of *m* words each having *n* bits, comprising

*m* insulating primary sheets each having *n* apertures therein and each having a ladder-pattern printed primary winding thereon wherein first and second side conductors extend on the two respective sides of the apertures and wherein cross conductors connect the side conductors between the apertures, a portion of the first side conductor near an aperture being punched out for the storage of a 0 and a portion of the second side conductor near an aperture being punched out for the storage of a 1,

*n* E-shaped magnetic members each having a central leg extending through corresponding apertures in all of said primary sheets, and having side legs extending outside said primary sheets,

*n* magnetic bars bridged across the ends of the central and side legs of respective ones of said E-shaped members, whereby said members and bars define *n* magnetic cores, and a different secondary winding wound around the central leg of each respective one of said magnetic cores.

2. A semi-permanent memory construction for the storage of *m* words each having *n* bits, comprising

*m* insulating primary sheets each having *n* apertures therein and each having a ladder-pattern printed primary winding thereon wherein first and second side conductors extend on the two respective sides of the apertures and wherein cross conductors connect the side conductors between the apertures, a portion of the first side conductor near an aperture being punched out for the storage of a 0 and a portion of the second side conductor near an aperture being punched out for the storage of a 1,

*n* magnetic cores defined respectively by E-shaped members each with a central leg through corresponding apertures in all of said primary sheets and each with a side leg, and respectively by magnetic bars bridged across the ends of the central and side legs of respective ones of said E-shaped members, a multi-turn secondary winding wound around the central leg of each respective one of said magnetic cores, means to apply an interrogation pulse through any selected one of said primary windings, and means to sense the signal induced in each of said secondary windings as a 0 or a 1 depending on the effective configuration of the interrogated primary winding.

3. A semi-permanent memory construction for the storage of *m* words each having *n* bits, comprising

*m* insulating primary sheets each having *n* apertures therein and each having a ladder-pattern printed primary winding thereon wherein first and second side conductors extend on the two respective sides of the apertures and wherein cross conductors connect the side conductors between the apertures, said side conductors being selectively broken for the storage of information, an insulating secondary sheet having *n* apertures therein each surrounded by a printed secondary winding,

*n* E-shaped magnetic members each having a central leg extending through corresponding apertures in all of said primary sheets and extending through one aperture of said secondary sheet, and having side legs extending outside said primary and secondary sheets, a magnetic bar bridged across the ends of the central and side legs of each of said E-shaped members, whereby said members and bars define *n* magnetic cores, means to apply an interrogation pulse through any selected one of said primary windings, and means to sense the signal induced in each of said secondary windings.

References Cited by the Examiner

UNITED STATES PATENTS 2,788,005 1/1957 Allen ------------ 340—174

IRVING L. SRAGOW, *Primary Examiner*.